(12) United States Patent
Barclay et al.

(10) Patent No.: US 7,017,918 B2
(45) Date of Patent: Mar. 28, 2006

(54) COMBUSTION STOPPER SEAL

(75) Inventors: Gregory Barclay, Mt. Prospect, IL (US); Tom Molitor, Arlington Heights, IL (US); Daniel Jele, Hoffman Estates, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/004,071

(22) Filed: Oct. 25, 2001

(65) Prior Publication Data

US 2003/0080514 A1   May 1, 2003

(51) Int. Cl.
*F02F 11/00*   (2006.01)
(52) U.S. Cl. ....................... 277/593; 277/591
(58) Field of Classification Search ................ 277/591, 277/592–598; 29/888.3
See application file for complete search history.

(56) References Cited

U.S. PATENT DOCUMENTS

| | | |
|---|---|---|
| 3,957,279 A | 5/1976 | Belter |
| 3,970,322 A | 7/1976 | Stecher et al. |
| 4,333,663 A | 6/1982 | Friedrichs |
| 4,405,138 A | 9/1983 | Skrycki |
| 4,448,431 A | 5/1984 | Majewski et al. |
| 4,721,315 A * | 1/1988 | Ueta ........................... 277/593 |
| 4,723,783 A | 2/1988 | Belter et al. |
| 4,756,537 A | 7/1988 | Beyer et al. |
| 4,776,602 A | 10/1988 | Gallo |
| 4,781,389 A | 11/1988 | Beyer et al. |
| 4,822,062 A | 4/1989 | Gallo et al. |
| 4,962,939 A | 10/1990 | Lonne et al. |
| 5,094,468 A | 3/1992 | Hieble |
| 5,197,747 A * | 3/1993 | Ueta et al. ................... 277/595 |
| 5,310,197 A | 5/1994 | Bruch et al. |
| 5,362,074 A | 11/1994 | Gallo et al. |
| 5,427,388 A | 6/1995 | Ueta |
| 5,468,003 A | 11/1995 | Staab et al. |
| 5,540,452 A | 7/1996 | Belter |
| 5,695,200 A | 12/1997 | Diez et al. |
| 5,713,580 A * | 2/1998 | Ueta ........................... 277/593 |
| 5,727,795 A * | 3/1998 | Plunkett ...................... 277/601 |
| 5,791,659 A | 8/1998 | Takada et al. |
| 5,863,046 A | 1/1999 | Diez et al. |
| 5,875,548 A | 3/1999 | Diez et al. |
| 5,876,038 A | 3/1999 | Bohm et al. |
| 5,921,558 A | 7/1999 | Kozerski |
| 5,927,724 A | 7/1999 | Maschmann et al. |
| 5,957,463 A * | 9/1999 | Inamura ...................... 277/593 |
| 5,979,905 A | 11/1999 | Fischer et al. |
| 5,984,317 A | 11/1999 | Grant-Acquah et al. |
| 6,003,877 A | 12/1999 | Martin et al. |
| 6,019,376 A * | 2/2000 | Miyaoh ........................ 277/593 |

(Continued)

FOREIGN PATENT DOCUMENTS

DE   4235087 A1   4/1994

(Continued)

*Primary Examiner*—Vishal Patel
(74) *Attorney, Agent, or Firm*—Dickinson Wright PLLC

(57) ABSTRACT

A gasket having a gasket plate formed with an aperture. An annular flange provides a stopper seal around the aperture. The flange has spaced areas of varying thickness. The gasket is formed by punching an opening in the gasket plate inwardly of an annular array of bolt-holes. An annular portion of the plate surrounding the opening is folded back to form the flange and place it in surface-to-surface contact with the plate. The areas of the flange adjacent to the bolt-holes are compressed a greater amount than areas of the flange more remote from the bolt-holes.

3 Claims, 4 Drawing Sheets

U.S. PATENT DOCUMENTS

| | | |
|---|---|---|
| 6,053,503 A | 4/2000 | Buck et al. |
| 6,092,810 A | 7/2000 | Plunkett |
| 6,113,109 A | 9/2000 | Lieb et al. |
| 6,148,516 A | 11/2000 | Diez et al. |
| 6,209,883 B1 | 4/2001 | Kashmerick et al. |
| 6,250,644 B1 | 6/2001 | Diez et al. |
| 6,318,733 B1 * | 11/2001 | Udagawa .................... 277/596 |
| 6,336,639 B1 * | 1/2002 | Ishida et al. ................. 277/594 |
| 6,450,504 B1 * | 9/2002 | Bleidt et al. ................. 277/592 |

FOREIGN PATENT DOCUMENTS

| | | |
|---|---|---|
| EP | 0485693 A1 | 5/1992 |
| JP | 6174099 | 6/1994 |
| JP | 6174100 | 6/1994 |

* cited by examiner

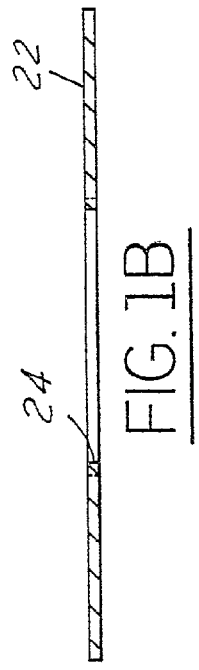
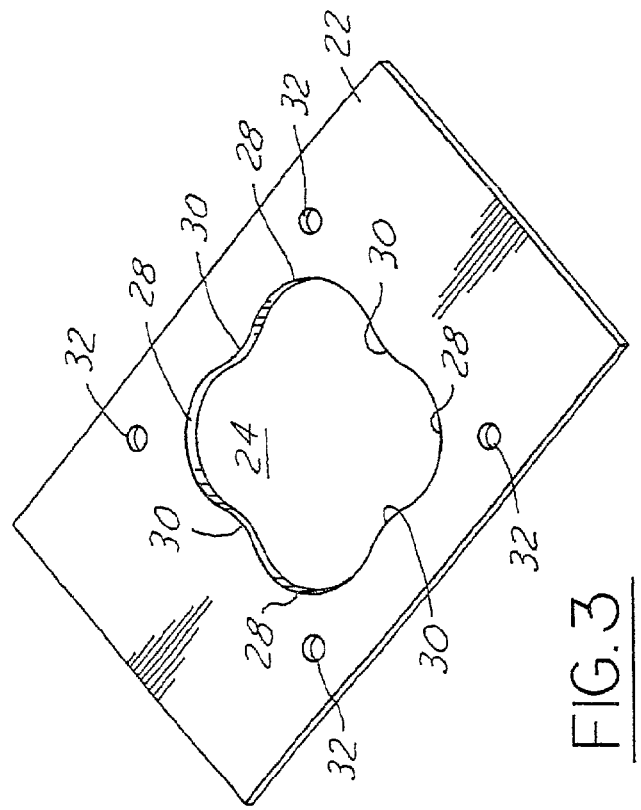
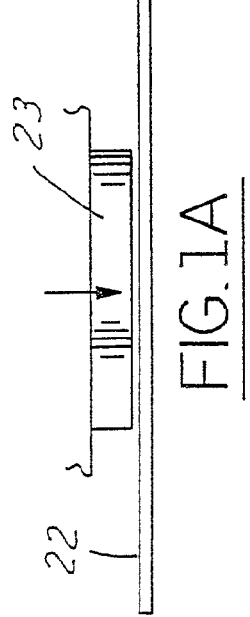
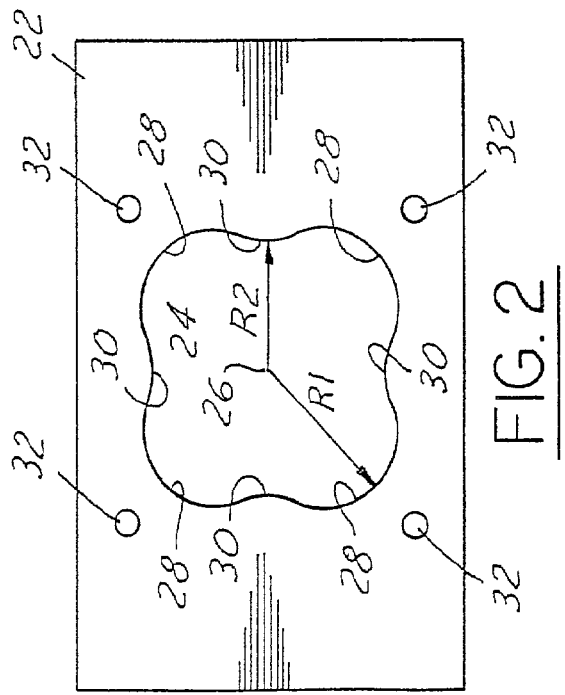

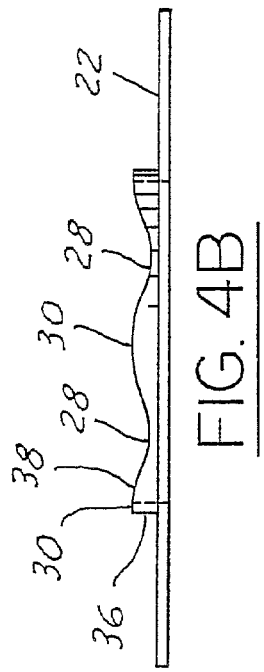
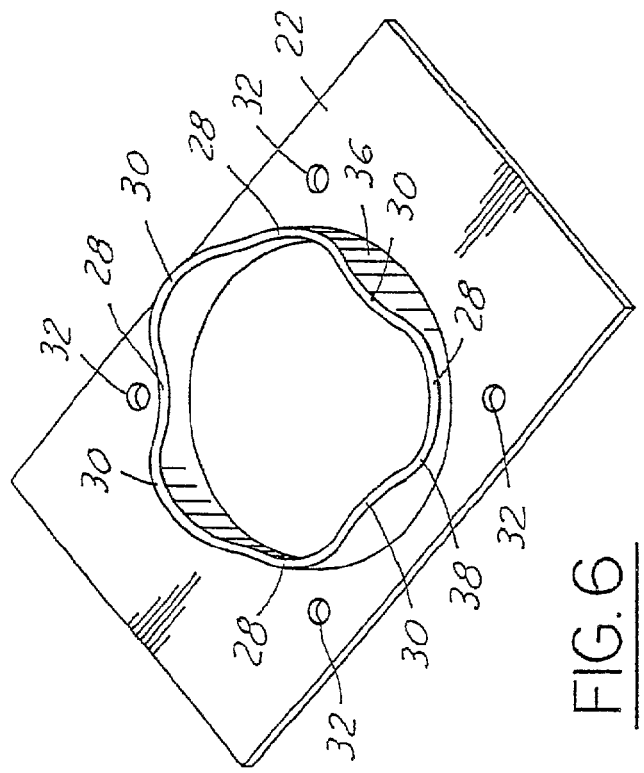
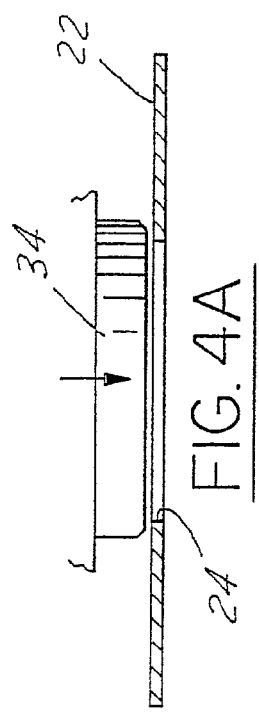
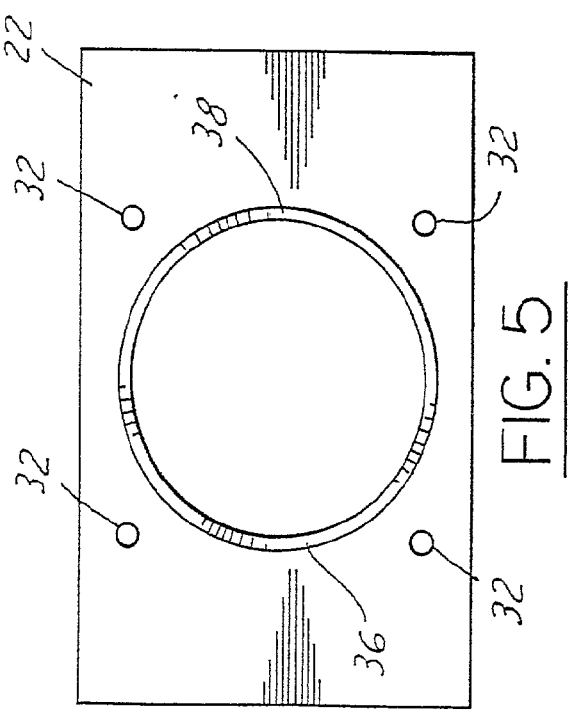

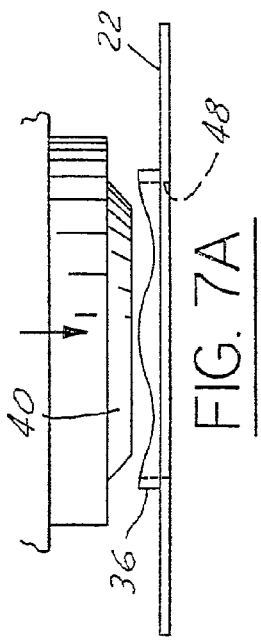
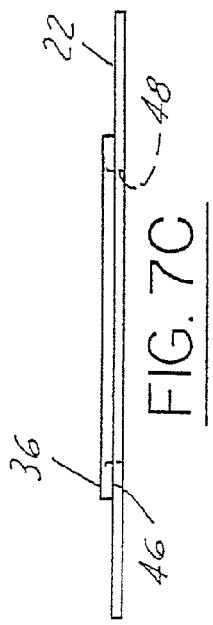
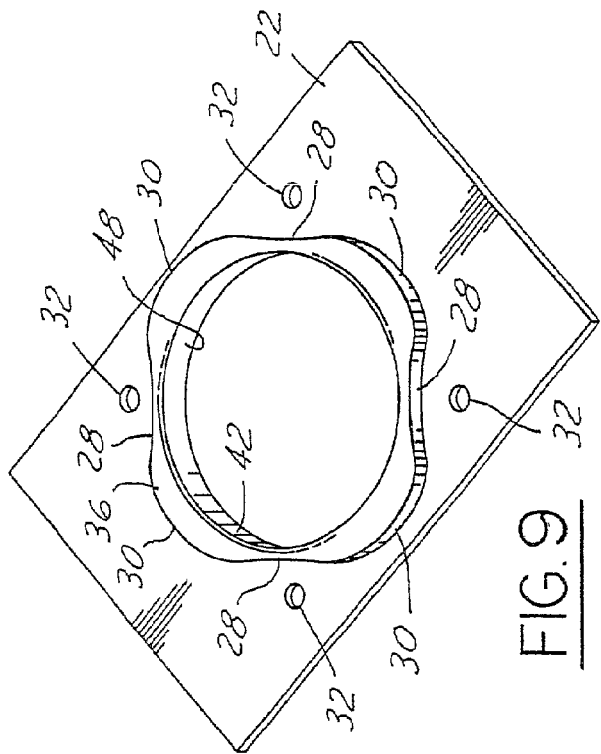
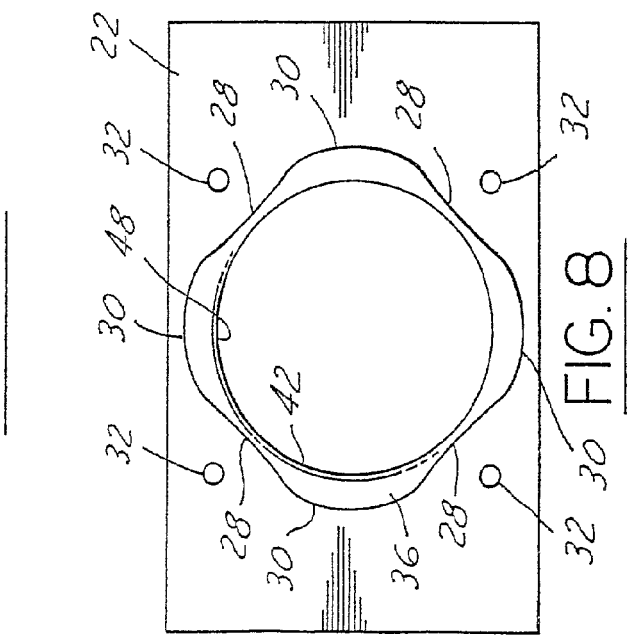

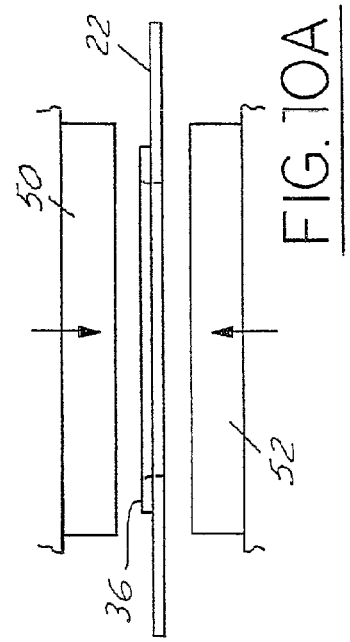
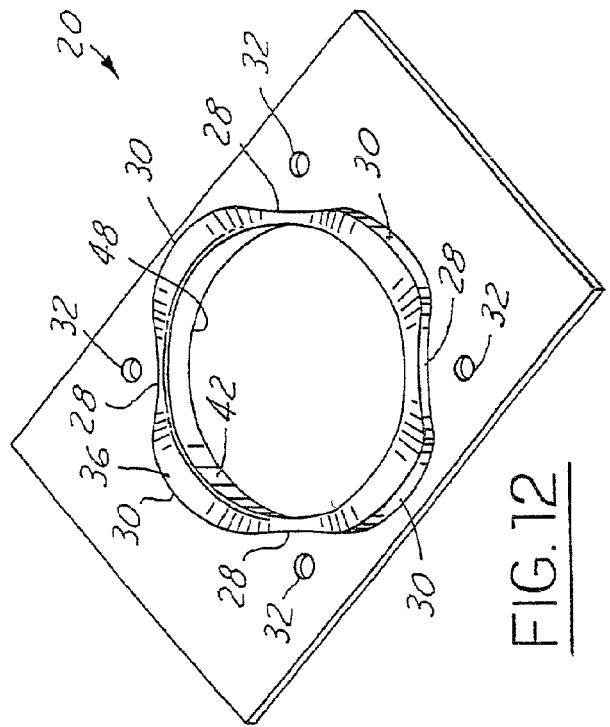
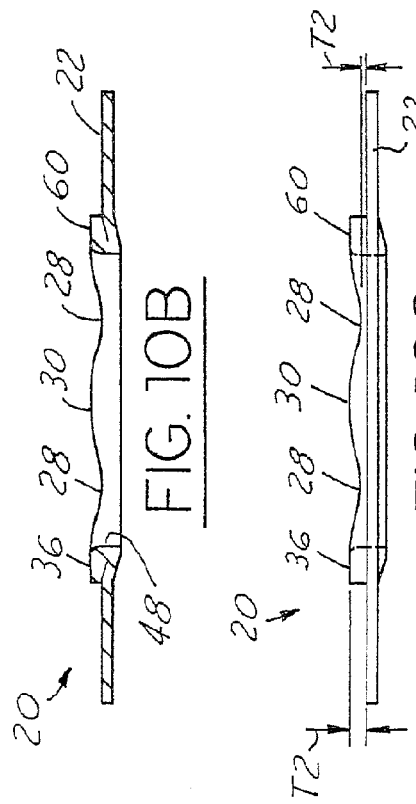
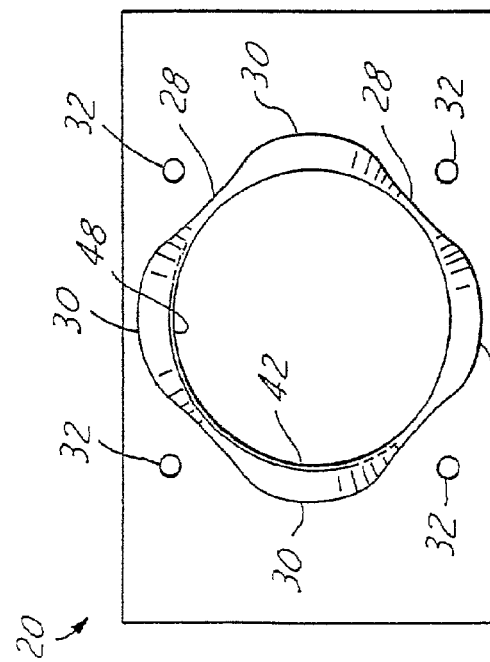

COMBUSTION STOPPER SEAL

This invention relates to combustion stopper seals for cylinder head gaskets of vehicle engines and a method of making the same.

BACKGROUND OF THE INVENTION

Metal gaskets are well known for providing a seal between a cylinder head and a cylinder block of a motor vehicle engine. Typically these gaskets are formed with apertures over the combustion openings of the cylinders, and some gaskets have special sealing elements around the apertures to increase their sealing effectiveness. Such sealing elements may be formed by folding back an annular portion of the gasket about a circular fold line and pressing it against the main body of the gasket to form a stopper seal.

One of the problems associated with stopper seals is an uneven distribution of compression loading around the aperture. It has been discovered that the greatest load on the stopper seal is at or near the bolt-locations, that is, in the areas adjacent to the bolts which typically secure the gasket to the engine block. It is estimated that as much as 65% of the load is concentrated at the bolt-locations.

There are difficulties in sealing the combustion opening of an operating engine which arise from dynamic motion of the engine parts caused by operating conditions such as firing pressures and thermal gradients, for example, as well as parts design and material selection. To overcome these difficulties, it would be highly desirable to provide a stopper seal wherein the load is more evenly distributed and thus the sealing effectiveness is materially increased.

SUMMARY OF THE INVENTION

In accordance with the present invention, the gasket has an annular flange around the aperture to provide a stopper seal. The flange has spaced areas of varying thickness. Preferably the flange is a folded-over portion of the gasket plate and the areas of reduced thickness are adjacent to the bolt-receiving holes. By thus reducing the thickness of the flange adjacent to the bolt-holes where loading tends to be concentrated, it is possible to spread the loading so that it is more evenly distributed.

In accordance with a preferred method of the invention, an opening is formed in a gasket plate radially inwardly of an annular array of bolt-holes. The opening is non-circular and has edges adjacent to the bolt-holes which are spaced radially outwardly of a center point of the opening a greater distance than the intervening edges. An annular portion of the plate surrounding the opening is folded back about a circular fold line to form a flange which is placed in surface-to-surface contact with an underlying portion of the plate adjacent to the fold line such that the edges of the flange face radially outwardly. The flange is then compressed. Compression of the flange will result in areas of the flange adjacent to the bolt-holes, being compressed a greater amount, and hence be of lesser thickness, than the other areas of the flange more remote from the bolt-holes. This is due to the fact that the areas of the flange adjacent to the bolt-holes are of lesser radial extent and therefore have less resistance to forces of compression. The flange thus formed serves as a stopper seal for the gasket.

One object of this invention is to provide a gasket and gasket-making method having the foregoing features and capabilities.

Other objects, features, and advantages will become apparent as the following description proceeds, especially when considered with the accompanying drawings.

BRIEF DESCRIPTION OF THE DRAWINGS

FIG. 1A is an view showing an initial step in the method of this invention in which an opening is punched in a gasket plate.

FIG. 1B is a sectional view of the gasket plate after the opening has been punched.

FIG. 2 is a plan view of the punched gasket plate.

FIG. 3 is a perspective view of the punched gasket plate.

FIG. 4A is a view of a second step in the method in which an annular flange is punched around the opening in the gasket plate.

FIG. 4B is an edge view of the gasket plate showing the flange thus formed.

FIG. 5 is a plan view of the gasket plate shown in FIG. 4B.

FIG. 6 is a perspective view of the gasket plate shown in FIG. 4B.

FIG. 7A is a view showing a third step in the method in which the annular flange is folded radially outwardly and doubled over against the main body portion of the gasket plate.

FIG. 7B is a sectional view showing the gasket plate with the outwardly folded annular flange pressed flat against the main body of the gasket plate.

FIG. 7C is an edge view of the gasket plate as shown in FIG. 7B.

FIG. 8 is a plan view of the gasket plate as shown in FIG. 7C.

FIG. 9 is a perspective view of the gasket plate.

FIG. 10A is a view showing the annular flange being compressed against the main body of the gasket plate.

FIG. 10B is a sectional view showing the gasket plate after the compression of the annular flange, completing the formation of the gasket of this invention.

FIG. 10C is an edge view of the gasket plate shown in FIG. 10B.

FIG. 11 is a plan view of the gasket.

FIG. 12 is a perspective view of the gasket.

DETAILED DESCRIPTION OF THE PREFERRED EMBODIMENTS

Referring now more particularly to the drawings, FIGS. 1A–10A illustrate a sequence of steps in the method of making the finished gasket 20 shown in FIGS. 10B–12. The gasket 20 is formed from a flat plate 22 of suitable material such as, for example, tin plated, low carbon steel and have a uniform thickness which may be about 0.015 inches.

Referring to FIGS. 1A–3, the plate 22 is initially blanked by a punch 23 moving vertically or perpendicularly relative to the plate 22 to form a non-circular opening 24 having a center point 26. The opening 24 has four equally, angularly, spaced apart convexly curved edge portions 28 which are spaced from the center 26 a distance R1. Between and separating the curved portions 28 are the curved portions 30 which are spaced from the center 26 a lesser distance R2. The shape and form of the opening is greatly exaggerated in FIGS. 2 and 3 to illustrate the difference in radius of the two curved portions 28 and 30. In point of fact, the difference in these distances is relatively small. Thus, for example, the distance R2 may be 0.5% to 3% less than R1 depending upon the particular application.

An array of bolt-holes 32 surrounding the opening 24 may be formed in the plate 22 either before or after the opening 24 is punched. It is noted that the relatively large diameter edge portions 28 of the opening 24 are located adjacent to the respective bolt-holes 32.

The next step in the formation of the gasket is a forming operation shown in FIGS. 4A–6 and employing a cylindrical punch 34. The punch 34 is of uniform circular cross-section and of larger diameter than the maximum diameter of the opening 24. The punch 34 is centered on the opening 24 and moves vertically or perpendicularly relative to the plate 22 to form a tubular, annular flange 36 which extends perpendicular to the plane of the plate. The flange 36 is circular and its outer edge portion 38 is wavy, reflecting the initial form of the edge portions 28 and 30 of the non-circular opening 24.

Thereafter the flange 36 is folded back in a closing operation. As seen in FIG. 7A, a frusto-conical folding tool 40 is centered on the annular flange 36 and is moved perpendicularly to the plate 22 to engage the flange 36 and fold it back or radially outwardly about a center fold line 42 into surface-to-surface contact with the underlying annular portion of the plate 22 adjacent to the fold line such that the edge portions 28 and 30 face radially outwardly and the flange is connected to the underlying portion of the plate 22 by a doubled-over portion 46 of the plate. The fold line 42 defines the marginal edge of an aperture 48 which will extend across a combustion opening of a cylinder when the gasket is in use. The folded over flange can be seen clearly in FIGS. 8 and 9, and again, it should be pointed out that the difference in radial extent of the edge portions 28 and 30 is greatly exaggerated in these Figures.

Finally, the flange 36 and the underlying annular portion of the plate 22 are compressed between the platens 50 and 52 which close perpendicularly on the plate 22 as shown in FIG. 10A. The compressed flange 36 thus becomes a stopper seal 60. FIGS. 10B–12 illustrate the compressed and flattened condition of the flange after compression. There will be a difference in thickness of the flange around its perimeter as shown in FIGS. 10B and 10C, the flange being thinner along the edge portions 28 than along the edge portions 30. Thus the thickness T1 in the areas along the edge portions 28 may be on the order of about 0.0035 inches, whereas the thickness T2 in the areas along the edge portions 30 may be on the order of about 0.0045 inches. These dimensions may vary. The thinner portions of the flange, it will be noted, are in areas adjacent to the bolt-holes 32.

The portions of the flange along the edge portions 28 adjacent to the bolt-holes is thinner than the portions along the edge portions 30 because the portions along the edge portions 28 have a lesser radial extent and hence offer less resistance to compression.

By forming the annular flange to a lesser thickness in the areas of the bolt-holes 32, it has been found that the distribution of loading forces on the flange when the gasket is bolted to the cylinder block is more evenly distributed than would be the case if the flange were of uniform thickness throughout its annular extent. The sealing effectiveness of the flange as a stopper seal is thus materially increased.

What is claimed is:

1. A gasket comprising
a metal gasket plate,
an aperture through said plate, and
an annular flange formed as one piece of the same material as said metal gasket plate and in folded over surface-to-surface contact with an annular portion of said plate surrounding the aperture,
said annular flange providing a stopper seal around the aperture,
said annular flange having arcuately spaced areas of varying thickness and varying radial extent relative to said aperture, with relatively thicker areas of said annular flange having a relatively greater radial extent than that of relatively thinner areas of said annular flange.

2. The gasket of claim 1, wherein said plate has bolt-receiving holes spaced radially outwardly from said flange in arcuately spaced relation to one another, and the areas of said flange adjacent to said bolt-receiving holes are of said lesser thickness and said lesser radial extent that that of the areas of said flange more distant from said bolt-receiving holes.

3. The gasket of claim 2, wherein the annular portion of the gasket is of uniform thickness.

* * * * *